United States Patent
Lilienthal et al.

(10) Patent No.: US 10,826,791 B2
(45) Date of Patent: *Nov. 3, 2020

(54) SYSTEMS AND METHODS FOR REMOTE DEVICE VIEWING AND INTERACTION

(71) Applicant: Projector.is, Inc., San Francisco, CA (US)

(72) Inventors: Benjamin Howard Lilienthal, San Francisco, CA (US); Eugene Abovsky, San Francisco, CA (US)

(73) Assignee: Projector.is, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/055,759

(22) Filed: Aug. 6, 2018

(65) Prior Publication Data

US 2019/0020554 A1 Jan. 17, 2019

Related U.S. Application Data

(63) Continuation-in-part of application No. 15/696,170, filed on Sep. 5, 2017, now abandoned, which is a (Continued)

(51) Int. Cl.
*H04L 12/28* (2006.01)
*H04L 12/24* (2006.01)
(Continued)

(52) U.S. Cl.
CPC ............ *H04L 41/22* (2013.01); *G06F 3/0482* (2013.01); *G06F 21/629* (2013.01); *H04L 41/5061* (2013.01); *H04L 51/046* (2013.01); *H04L 51/10* (2013.01); *H04L 51/18* (2013.01); *H04L 65/1069* (2013.01); *H04L 65/1086* (2013.01); *H04L 65/1089* (2013.01);
(Continued)

(58) Field of Classification Search
CPC ......... H04L 41/22; H04L 51/18; H04L 67/06; H04L 67/125; G04F 3/14; G06F 3/1454
USPC .......................................... 370/401, 386, 252
See application file for complete search history.

(56) References Cited

U.S. PATENT DOCUMENTS 10,777,326 B2 * 9/2020 Shaya .................... G06F 3/0482
2003/0229900 A1 * 12/2003 Reisman ............... G06F 16/954
725/87

(Continued)

*Primary Examiner* — John Pezzlo
(74) *Attorney, Agent, or Firm* — Cogent Law Group LLP; Evan R. Smith

(57) ABSTRACT

A system and process are provided for remotely viewing a customer screen image and interacting with the customer's device (desktop, laptop, tablet or smartphone) using a standard web browser. In operation, an agent is provided with an account on a server, and can send a link and/or instructions to the customer to provide the agent with access to the customer device. An application installed on the customer device captures image frames to be shared and divides them into subsections, transmitting to the server only those sections that have changed relative to the previously transmitted frame. The agent's browser retrieves tiles from the server as they change, and displays them for the agent. The system and process enable the agent to obtain system information and remotely control various functions of the customer device when authorized by the customer.

17 Claims, 14 Drawing Sheets

Related U.S. Application Data continuation-in-part of application No. 14/968,648, filed on Dec. 14, 2015, now Pat. No. 9,756,096.

(60) Provisional application No. 62/191,661, filed on Jul. 13, 2015.

(51) Int. Cl.
| | |
|---|---|
| *H04L 29/08* | (2006.01) |
| *H04L 29/06* | (2006.01) |
| *G06F 3/0482* | (2013.01) |
| *H04L 12/58* | (2006.01) |
| *G06F 21/62* | (2013.01) |
| *H04J 1/16* | (2006.01) |
| *G06F 9/451* | (2018.01) |

(52) U.S. Cl.
CPC .......... *H04L 65/4015* (2013.01); *H04L 65/80* (2013.01); *H04L 67/06* (2013.01); *H04L 67/125* (2013.01); *H04L 67/38* (2013.01); *G06F 9/453* (2018.02)

(56) References Cited

U.S. PATENT DOCUMENTS

| | | | |
|---|---|---|---|
| 2014/0215508 A1* | 7/2014 | Wyatt | H04N 5/262 725/24 |
| 2015/0039998 A1* | 2/2015 | Lieb | G06F 3/1454 715/234 |
| 2020/0249807 A1* | 8/2020 | Behar | G06F 1/169 |

* cited by examiner

SYSTEMS AND METHODS FOR REMOTE DEVICE VIEWING AND INTERACTION

This application is a continuation-in-part of U.S. patent application Ser. No. 15/696,170, filed Sep. 5, 2017, which is a continuation-in-part of U.S. patent application Ser. No. 14/968,648, filed Dec. 14, 2015, now issued as U.S. Pat. No. 9,756,096, all of which claim the benefit of U.S. Provisional Patent Application 62/191,661, filed Jul. 13, 2015, titled "Systems and Methods for Remote Presentation". The entire disclosures of the above applications are incorporated herein by reference.

TECHNICAL FIELD

The present invention is directed to displaying information from a first computing device on the screen of a second computing device and providing remote control options to enable shared viewing, operation, technical support, or other functions.

BACKGROUND ART

Technical support, training services, sales presentations, and transactions are often conducted electronically via the internet, or using an internet data connection and a telephone link. Remote support technology is particularly helpful in the field of information technology support, making it possible to view a problem experienced by a remote customer, take control of the device, and correct the problem or show the user how to operate a device or application.

Traditionally, these sessions have been accomplished using a web service and an application that both parties must install on their computer before the session can begin. Prior art remote support products have deficiencies in terms of training required for support personnel, consistent operation across platforms, ease of establishing a connection, and difficulties such as software incompatibilities and inability of the person seeking support to load enabling software. In general, conventional approaches have not provided any convenient method for easily and rapidly accessing different types of user devices without advance preparation.

Therefore, the inventors have determined that there is a need for improved systems and methods for remotely viewing a device's screen, interacting with the remote user, and controlling the remote device.

DISCLOSURE OF THE INVENTION

In an example embodiment, techniques for improved methods of sharing screen views and application functions with a person at another location are implemented using a novel server-based system. In particular embodiments, the disclosed system provides a method for conducting an electronic interaction by receiving an image of a desktop, screen, or application at a computing device (desktop, laptop, tablet or smartphone) with a streamlined connection process that does not require specialized software at the viewer location. The user's screen image is viewed through a standard web browser (for example, Chrome, Firefox, or later versions of Internet Explorer).

In an example embodiment, novel systems and methods according to the present invention are implemented in a remote interaction system. The system and methods disclosed are useful for information technology support, e-commerce, sales presentations, and other functions. In certain disclosed embodiments, the present systems and methods allow an agent to remotely view a user's screen display from a standard browser. In such embodiments, the agent may be considered a viewer, and these two terms are therefore used interchangeably herein. With the user's permission, the agent can guide the user (also known as a customer herein) with a pointer controlled by the agent and displayed on the user's screen. The agent can also take over control of the user's device and remotely control its functions through the user's operating system. For example, the agent can remotely select items displayed on a touch screen in iOS or Android OS, or remotely control a mouse in MacOS or Windows. In an embodiment, customer support agents using the system can view and remote-control the customer's screen directly in their web browser, without installing any special software or plug-in. In an embodiment, the user can elect to pause the session; during such a pause, the agent, normally able to see the customer's screen, is unable to do so. The customer may subsequently resume the session, at which point the agent will once again be able to see the customer's screen on the agent's display. In an embodiment, the agent can transfer a file from the agent's computing device (also referred to herein as the viewer device) to the user's device. The file may be any kind of file, such as a media file or an executable file for example and without limitation. Analogously, the user may transfer a file from the user's computing device to the agent's device. In an embodiment, an agent may also invite one or more other agents to participate in a session with a customer.

In an embodiment, the user activates a link transmitted by the agent or enters a session ID code into a web page or mobile application. The server identifies the user's operating platform and initiates remote support for the user device. The system preferably encrypts communications between the customer device and the server, and the server and the agent browser. In the example embodiment, 256-bit SSL is used. When used for technical support, in some disclosed embodiments the system generates a one-time key for the encrypted session. This method provides secure one-time access to the customer's device without compromising device security.

The disclosed system and method provides a variety of significant unobvious advantages. The example system is easier to use and maintain because it requires no desktop software for agents. This is a significant feature because customer support agents may be teleworking from home or another location that may not be in the same area or nation as the company they are supporting. In these situations, in-person information technology support and maintenance may not be available to customer support or customer service agents. The ability to sign in to a support workspace and provide support to customers through an ordinary browser significantly reduces potential technical problems for support agents. The disclosed system is more reliable because it does not require installation of software updates at the agent computer.

Another advantage arises from the simplified connection process for screen sharing between the customer and agent. The process used in the example embodiment shortens the time required to connect. Fast resolution of issues is one of the most important factors contributing to a positive customer support experience.

BRIEF DESCRIPTION OF THE DRAWINGS

The accompanying drawings, which are incorporated herein and form a part of the specification, illustrate various exemplary embodiments of the present invention and, together with the description, further serve to explain various principles and to enable a person skilled in the pertinent art to make and use the invention.

BEST MODE FOR CARRYING OUT THE INVENTION

Figure 1:
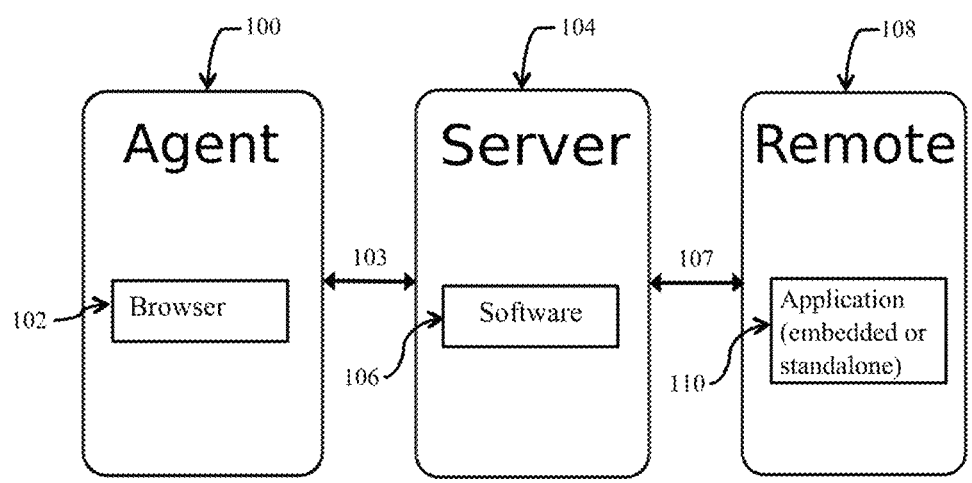
FIG. 1 is a block schematic diagram showing an example embodiment.

The present invention will be described in terms of one or more examples, with reference to the accompanying drawings.

The present invention will also be explained in terms of exemplary embodiments. This specification discloses one or more embodiments that incorporate the features of this invention. The disclosure herein will provide examples of embodiments, including examples from which those skilled in the art will appreciate various novel approaches and features developed by the inventors. These various novel approaches and features, as they may appear herein, may be used individually, or in combination with each other as desired.

The embodiment(s) described, and references in the specification to "one embodiment", "an embodiment", "an example embodiment", etc., indicate that the embodiment(s) described may include a specific feature, structure, or characteristic, but every embodiment may not necessarily include the particular feature, structure, or characteristic. Moreover, such phrases are not necessarily referring to the same embodiment. Further, when a feature, structure, or characteristic is described in relation to an embodiment, persons skilled in the art may implement such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g. a computing device). For example, a machine-readable medium may include read only memory (ROM); random access memory (RAM); hardware memory in notebook and handheld computers, PDAs, smart phones, tablets, and other portable devices; magnetic disk storage media; optical storage media; thumb drives and other flash memory devices; electrical, optical, acoustical, or other forms of propagated signals (e.g. carrier waves, infrared signals, digital signals, analog signals, etc.), Internet cloud storage, and others. Further, firmware, software, routines, and instructions may be described herein as performing certain actions. However, it should be appreciated that such descriptions are merely for convenience and that such actions in fact result from computing devices, processors, controllers or other devices executing the firmware, software, routines, instructions, etc.

An example embodiment of the present invention provides the ability to transmit an image of a desktop or application to an agent's computing device (desktop, laptop, tablet or smartphone) without requiring the agent to download specialized software. The image is viewed by the agent through a standard web browser (for example, Chrome, Firefox, or later versions of Internet Explorer).

Embodiments disclosed herein are particularly useful for enabling e-commerce support and assistance, sales presentations, information technology support, and other functions that will be apparent to those skilled in the art upon review of the specification. Example embodiments will be presented generally in terms of a technical support use case that allows an "agent" (or "viewer") to access the device of a "customer" (or "user"), but these functional labels are for convenience, and are not intended to imply any limit on the range of uses of the system and methods disclosed herein. Depending on the intended use, the "agent" may be acting as a salesman, e-commerce telephone support person, trainer, teacher, parent, or engaged in any other activity or status where it is desirable to view the remote user's screen and/or interact with the remote device. Similarly, depending on the desired use, the "customer" may be acting as a client, buyer, trainee, student, child, or engaged in any other activity or status where it is useful to allow others to view the person's screen and/or interact with his device.

FIG. 1 is a block schematic diagram showing an implementation of an example embodiment. As shown in FIG. 1, an agent computing device 100 is supplied with an HTML5 viewer application 102. Viewer application 102 can be a function-specific viewing application, but preferably is a conventional web browser (HTML5 or its successors) with appropriate standard plug-ins. For convenience viewer application 102 will be referred to herein as a "browser," but is not limited to browsers.

A server 104 is connected via a communications network 103, such as the internet, to agent computing device 100. Customer computing device 108 is connected via a communications network 107, such as the Internet, to server 104.

Server 104 is provided with software 106 to perform agent account maintenance and control, transmit and receive screen displays, operating, and control information to and from a customer (or user) computing device 108. Software 106 may also perform other desired functions and may implement any features described or suggested herein. In an embodiment, file transfers between the customer (user) computing device 108 and the agent computing device 100 may take place via server 104. For example, a file that the agent wishes to transfer from agent device 100 to user device 108 may be sent from agent device 100 to server 104, where the file may be stored. When the customer wishes to access the file, he may download the file from server 104 to user device 108. Alternatively, the customer may access the file by opening the file from its location in server 104. Analogously, a file that the customer (user) wishes to transfer from user device 108 to agent device 100 may be sent from user device 108 to server 104, where the file may be stored. When the agent wishes to access the file, he may download the file from server 104 to agent device 108. Alternatively, the agent may access the file by opening it from its location in server 104.

Software 106 in server 104 preferably provides a function of downloading (as needed), or helping to arrange the download of, an interaction application 110 to the customer computing device 108. Interaction application 110 transmits screen displays to, and exchanges operating and control information with, server 104.

In some embodiments, a software development kit (SDK) is provided to developers of one or more applications for the customer computing device 108, to facilitate embedding the interaction functions described herein into an application used by the customer. In these embodiments, the desired interactions of the interaction application 110 with the server 104 are embedded in the developed application. In these embodiments interaction application 110 does not need to be separately installed prior to initiating an interaction session with agent computing device 100.

Communications networks 103 and 107 can be the same or different networks. Each network can be any type of known network, including without limitation a local wired or wireless network, a private network, or a public network such as the Internet.

Figure 2:
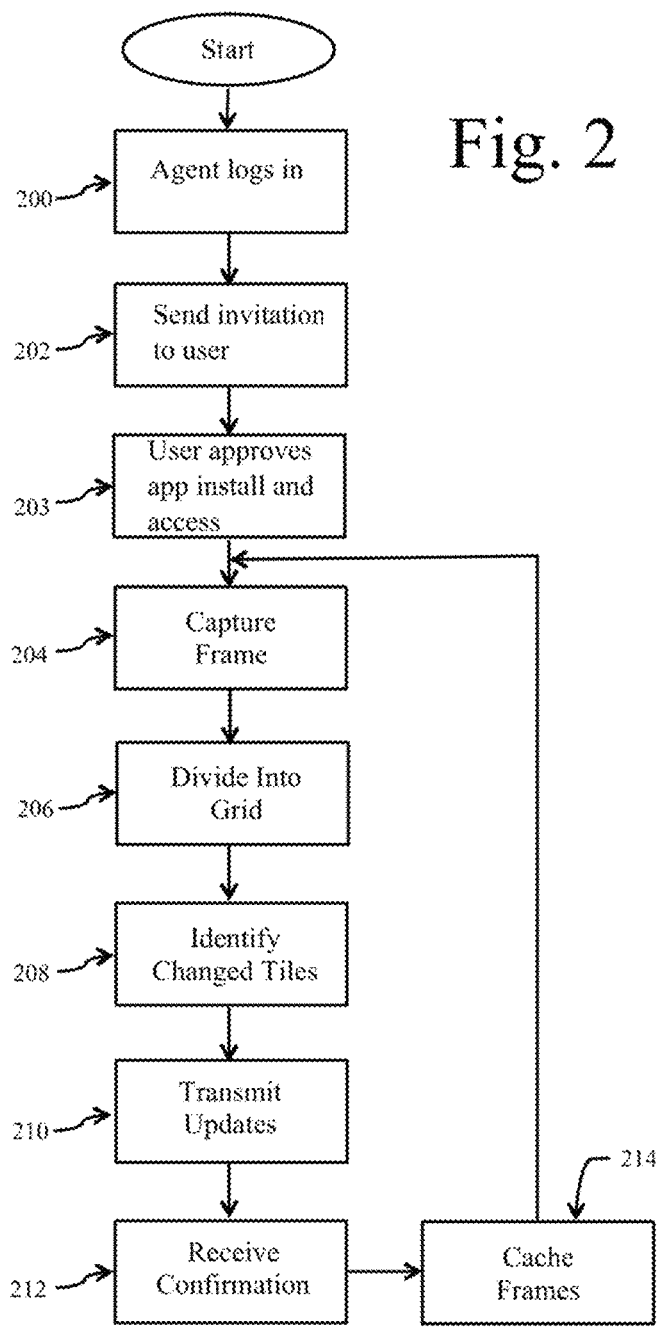
FIG. 2 is a flow chart showing a process for transmitting screen display information to enable remote viewing according to an example embodiment.

The process of transmitting an image from computing device 108 to agent computing device 100 using the example embodiment system and methods will now be described in detail. FIG. 2 is a flow chart showing an example embodiment of an operating process using the system shown in FIG. 1.

Initially, in step 200, the agent (for example, a person providing remote technical support to customers) is provided with an agent account and the agent's host computing device 100 is provided with software application 102.

In step 202, the agent invites the customer to allow remote viewing of the customer's screen. The invitation may take various forms. In an embodiment, the invitation includes transmitting a web link to the customer. Opening the web link connects the customer's device 108 to server 104, which identifies the operating system of the customer computing device 108 and offers the customer a download of a version of the interaction application that is compatible with customer computing device 108.

In another embodiment, the agent may use his/her browser interface to the server 104 to request from software 106 a "code" identifying a new interaction session. The customer may then be instructed to access a web page, or to access a technical support function of an application having an embedded interaction function. The customer enters the session ID code provided by the agent on the web page or in the embedded application. The ID code can have any desired form; in a preferred example embodiment, the session ID is a six-digit number.

For simplicity, the example embodiment will be described in terms of a single remote interaction session; however, an agent may have multiple sessions active at one time. The agent uses viewer application 102 (typically a browser) operating on agent computing device 100. In an embodiment, server 104 provides an executable script to the browser 102 in response to access by the browser (for example, in HTML5, Java, or other standard scripting language that can be interpreted by the browser). The script preferably defines a process of interaction with the server that enables the viewing processes described in detail herein.

In step 203, the customer approves the download of interaction application 110 and grants permission to the agent to view the customer's screen images (where required by the operating system of the customer computing device 108).

In the example embodiment, interaction application 110 performs a process loop during the period where the customer desires to provide a remote display of the screen or window image to the agent. This loop begins with step 204, where interaction application 110 captures an image frame from the screen, desktop or window that is being shared. In an example embodiment, a conventional Node-Webkit API such as "ChooseDesktopMedia" may be used to obtain a video stream of the host's desktop.

Next, in step 206 of this example embodiment, the frame is divided into an N×K grid by interaction application 110. N and K may be varied based on functional considerations, for example, the proportions of the host screen or window, the resolution of the host screen or window, the size, resolution, or speed characteristics of one or more remote display devices, and network bandwidth and other network performance characteristics. The inventors have determined that a 10×10 grid provides good functionality in many cases. The example embodiment will therefore be described in terms of a 10×10 grid (defining an array of 100 "tiles") although it will be understood that other values of N and K can be selected to optimize functions for particular host, remote device, and network characteristics.

In step 208, each grid tile is compared to the tile from the previous frame. In processing the first frame received, the frame is compared to a blank "previous frame" memory so all of the tiles will register as having changed.

In step 210, image information for any changed tiles is transmitted to the server. For the first frame processed, the entire image will be transmitted to the server for display on the remote device. For subsequent frames, only image data in those areas of the screen where the image has changed will be transmitted. This approach reduces bandwidth requirements and data usage since data will not be transmitted for static regions of the screen.

In step 212, the server confirms to the interaction application 110 that it has received the changed image content.

The confirmation of data receipt in step 212 as described herein acts as a natural bandwidth throttle, as the system preferably waits for the server to indicate receipt before new content is broadcast. This approach allows dynamic adjustment of the transmitted frame rate to accommodate the network bandwidth available to the customer device.

In an embodiment, in step 214 the transmitted frames are cached in storage in the server along with timestamps applied by the server (or by the interaction software if desired). The remote viewing browser may provide to the server (either via standard functions or a script) information about the last confirmed time stamp when image data was received.

In a first group of embodiments, the customer device 108 is a personal computer, such as a PC or Apple desk or notebook computer. In these embodiments, the interaction application 106 is designed to be compatible with the operating system available on the host computing device, such as MAC OS®, Microsoft Windows®, Linux, or others.

In a second group of embodiments, the customer computing device 108 is a smartphone, tablet, watch, or other small device operating system. For example, the interaction application may be designed to run under Apple iOS, various versions of the Android operating system, Windows Phone, BlackBerry, or other operating systems that become popular enough to warrant release of a custom version of the interaction application.

In an embodiment, when the customer is using a computer such as a PC or Mac with a large display area, the customer can elect to share their entire desktop or limit the image transmission to a selected application window. When using an iOS-based device, the customer may, if desired, be provided with options to share web browsing, pictures and videos from the device, as well as documents accessible via iOS from the cloud such as iCloud, Dropbox, and other storage mechanisms.

Preferably an Android version of the hosting software is configured to allow sharing any content that is visible on the Android screen. This can be accomplished under Android version 5.0 or higher, similar to "sharing the desktop" from a PC. To achieve screen sharing from an Android device, an Android API is used to capture bitmap data that contains the image of the screen. The resulting bitmap is then divided into tiles and processed through the same screen synchronization algorithm as described herein for desktop screen sharing, allowing the agent to see the contents of the customer's Android device screen.

The software application 106 operating in server 104 preferably maintains accounts for agents and requires the agent to sign in with a password or other appropriate authentication to use the system. Application 106 may, if desired, maintain a history record of the sessions performed by each agent.

Server 104, while shown for simplicity as a single device in the example embodiment of FIG. 1, can be implemented using multiple servers and the functions described herein for the server can be divided between different devices as desired. In a preferred embodiment, a plurality of servers and connected and geographically distributed to serve users worldwide using cloud computing services such as Amazon Web Services or Google Cloud.

If desired, any of the functions described as being performed by the interaction application or the server application in the example embodiments herein can be reassigned to the other device. For example, the customer computing device could, if desired, periodically send full frame data to the server and the server could perform the analysis described herein to determine which tiles had changed, instead of this function being performed in the interaction application in the customer computing device.

In the example embodiments, the server 104 provides secure socket connections between the customer interaction application 110 and server 104, and between the browser 102 and server 104. These web sockets enable real-time communication.

In an embodiment, the server transcodes the image data it receives from the host into multiple resolutions and compression qualities. When an agent connects to the server to view a customer computing device, the server dynamically sets an optimal resolution and compression rate based on the screen size of the customer device and its observed rate of acknowledging the transmission of data, indicating actual available throughput. This enables optimizing bandwidth while providing a high fidelity viewing experience. Further, if the server's receipt of transmitted data is slow, indicating that there is a bandwidth limitation in the channel to the customer's device, the interaction application may increase compression of the image data to reduce the amount of data required to maintain substantially live frame updates. Those skilled in the art can determine desired thresholds for varying compression by observing the response of the interaction application to update requests for screen data, and tuning the data rate to provide a response that satisfies the agents using the system. In further embodiments, the agent may be provided with a manual adjustment control in the browser display to remotely increase or decrease the bandwidth of the screen data transmitted by the interaction application 110.

The server transmits tile data to the browser via the authenticated socket connection. The browser can then render and display the tile data with an HTML5 application that runs in its native JavaScript engine.

The script operating in association with the agent's browser makes a request to the server for tiles, which it then renders on the agent's browser and converts into an image that is the representation of the customer's screen content. The script may also provide zoom and pan functions to assist in viewing detailed images on smaller screens.

In an embodiment, the request from the agent browser script carries a timestamp for the last tile that it received from the server. On initial join, the time stamp is set to zero. On subsequent requests, the browser script indicates the last time it received content from the server. The server application preferably sends only tiles that have changed since that time stamp. This approach optimizes the refresh rate to available bandwidth.

Figure 3:
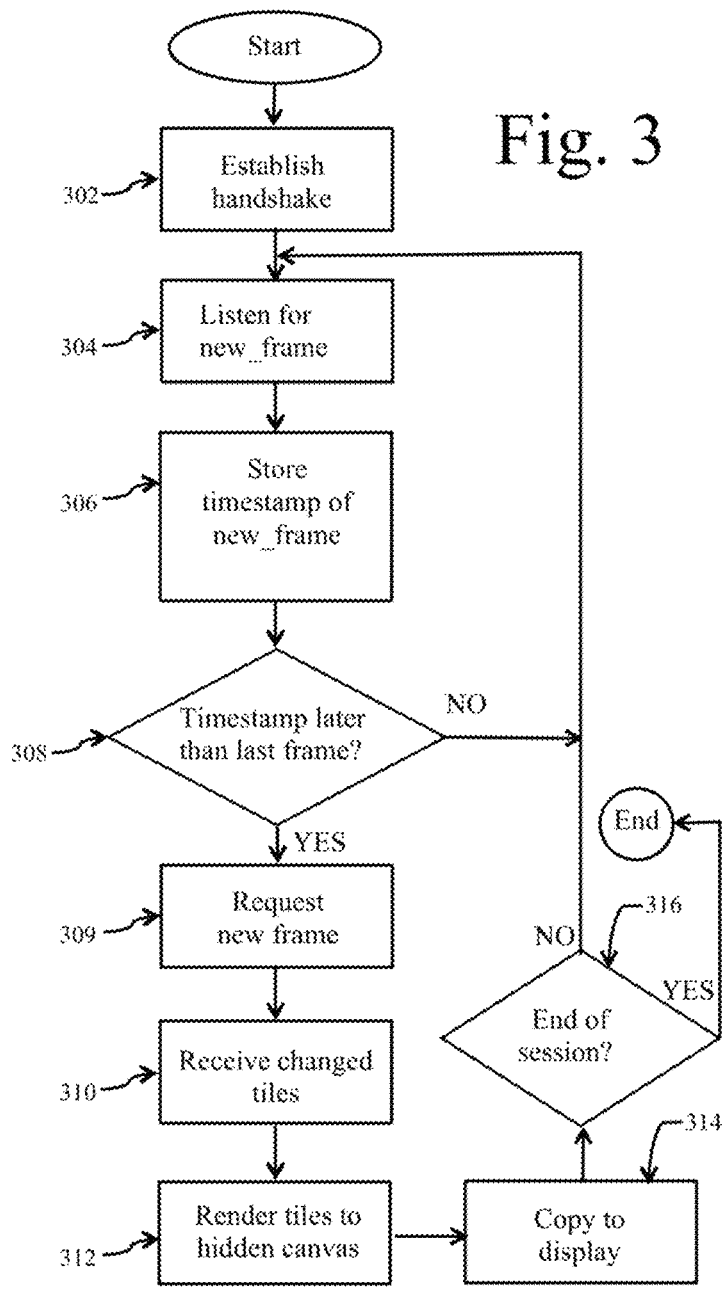
FIG. 3 is a flow chart of a preferred embodiment of a process for operating a browser to efficiently receive image tile updates from a server.

An embodiment of a viewing browser interface to the server will now be described in further detail with reference to the flow chart shown in FIG. 3.

First, in step 302, the browser performs a handshake routine and establishes a secure connection with the server. Preferably the system and the access provided to customer devices is secured by encryption and other best-practices security procedures. In an embodiment, all data throughout the system (including data between the customer device and the server and between the server and the agent browser) is SSL encrypted using TLS 1.2 transport security with AES-256-bit encryption.

In an embodiment, each session is assigned a unique, one-time key that expires when the session is complete, and is therefore not reusable. In a PC environment, the interaction application may also be programmed to auto-delete itself when the session ends, so there is no possibility of starting another session without the end-users' contemporaneous consent and intent.

Once the browser has connected, a continuous loop for processing received image data begins at step 304, where the browser starts listening for "new_frame" events from the server. A new frame event transmitted to the browser indicates that new image content is available on the server. This event also carries a time-stamp for the frame.

When a "new_frame" event is received, in step 306, the "last available frame" timestamp on the browser is set to that of the time-stamp received for the new_frame.

In step 308, the process determines whether the timestamp associated with the last available frame is later than the timestamp associated with the last rendered frame. If so, the process continues with step 309, where the browser queries the server with a "get_frames" call which also carries a "last rendered" time-stamp for the server. If the browser has already received the frame associated with the new_frame event, the process continues at step 304 to await the next frame event.

In response to the frame request in step 309, in step 310 the browser receives changed tiles from the server. The server responds to the frame request by transmitting the set of tiles (sections of the host's screen image) that have changed since the time-stamp provided by the browser client. In other words, the server will respond by transmitting all the sections of the screen that have changed since the last time the browser client updated. Each tile object preferably consists of metadata providing positioning information (width, height, x offset, and y offset), and JPEG image data. The JPEG data is preferably encoded in the then-current standard encoding format, depending on the capabilities of the browser. For older browsers, JPEG data may be transmitted as base64 encoded (requiring slightly more bandwidth). Browsers that support the Blob API released by Mozilla (https://developer.mozilla.org/en-US/docs/Web/API/Blob), can receive data in a more efficient binary format. As new encoding formats are developed, preferably the server software 106 is updated to support the latest formats.

In step 312, each tile is rendered in the browser. In a preferred embodiment, the tiles are rendered to hidden HTML5 Canvas objects according to specifications provided by Mozilla (see https://developer.mozilla.org/en-US/docs/Web/HTML/Element/canvas). The tiles preferably have the same dimensions as the interaction application's stream. The tile metadata is used to position the JPEG image of the tile in the correct position on the Canvas object.

After the tile image data is rendered onto the hidden canvas, in step 314 the final composed image from the hidden canvas object is copied over to a second canvas object that is used to display the image to the viewer in the browser. This second canvas will be referenced herein as the "display canvas."

In step 316, if the process has not been cancelled (for example, at the end of the session, or when the agent or customer withdraws or is removed from the session), the processing loop restarts beginning with step 304. The processing loop maintains the browser's view in sync with the display on the customer computing device while minimizing latency.

Figure 4:
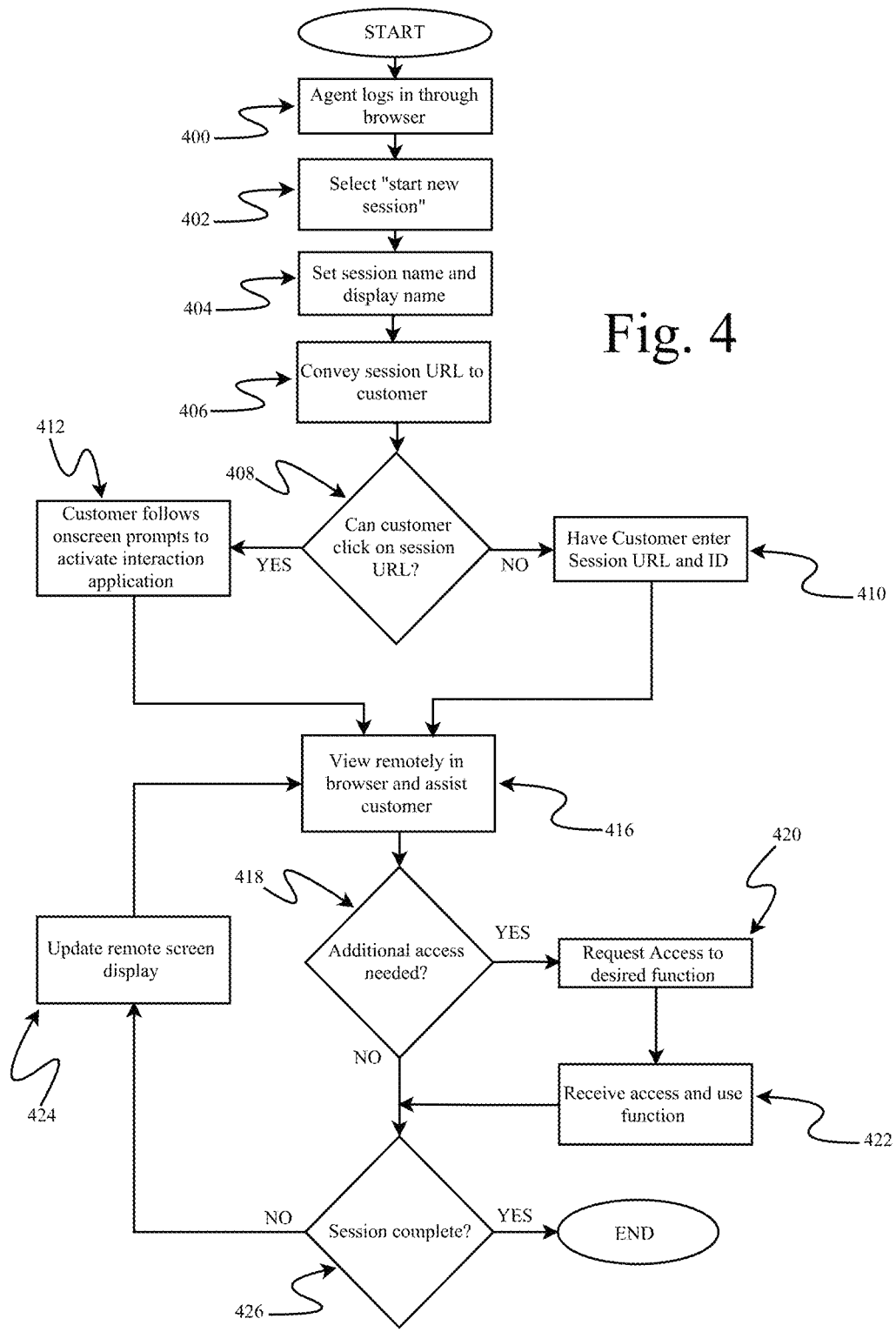
FIG. 4 is a flow chart of an example embodiment of a process for conducting remote technical support.

FIG. 4 is a flow chart showing the operation of an example embodiment of a technical support process employing some of the novel processes and systems disclosed herein. In this embodiment, beginning at step 400, the agent logs in through a browser. The agent navigates to the web address of server 104, obtaining (for example) the screen view of FIG. 5, and selects "start new session" in step 402. In step 404, the agent may optionally select a session name and select how the agent's name should be displayed to the customer.

In step 406, the agent is provided with a session URL to which the customer should navigate, and conveys it to the customer verbally, or by text or email. If there is an active communications channel between the agent and the customer that allows the agent to present the customer with a text Session URL link that can be "clicked" on to begin the session, the process continues at step 412, in which the customer clicks on the link and follows onscreen prompts to activate the interaction application 110. If the customer cannot directly receive and click on the session URL, in step 410, the agent provides the customer with the session URL and the session ID, and the customer enters these manually to initiate download of the appropriate version of the interaction application for the customer device operating system.

In step 416, the agent can remotely view the customer's screen display and advise the customer on operation of the customer's application or device. In addition to advising the customer (user), the agent (viewer) may also transfer one or more files to the customer. Such files, referred to herein as viewer device files, may include one or more executables (e.g., an application, patch, or script), media files, or other file types. As will be described in greater detail below, the agent may select a file at his computing device through a menu selection of drag and drop interface. The customer may then be notified of the file's accessibility, and the customer may then elect to accept or reject the file (or access thereto). In an embodiment, the viewer device file may be uploaded to a server, from which the customer may download the file. The download may take place from a public folder at the server, where the folder is specific to the session. The customer may alternatively open the file from its location at the server. Communication of a file from the agent to the server, and from the server to the user, may take place using any protocol known to persons of skill in the art.

In an embodiment, the customer may have the option to reject the file and all future file transfers with an input from the customer. The customer may also have the option to accept the file and all future file transfers with a different input. Such a blanket rejection or acceptance may be, in various embodiments, specific to the current session, the particular agent, or for all sessions and agents. Moreover, the rejection or acceptance may pertain to specific files, specific file names, and/or specific file types. Such rejections or acceptances may be implemented by way of a file filter that can be configured by the customer or an authorized administrator. Such a file filter may remain in place until such time as the filter is rescinded or otherwise reconfigured.

One or more files may also be transferred from the customer device to the agent (known herein as user device files), through mechanisms analogous to those described above, according to an embodiment.

Figure 11A:
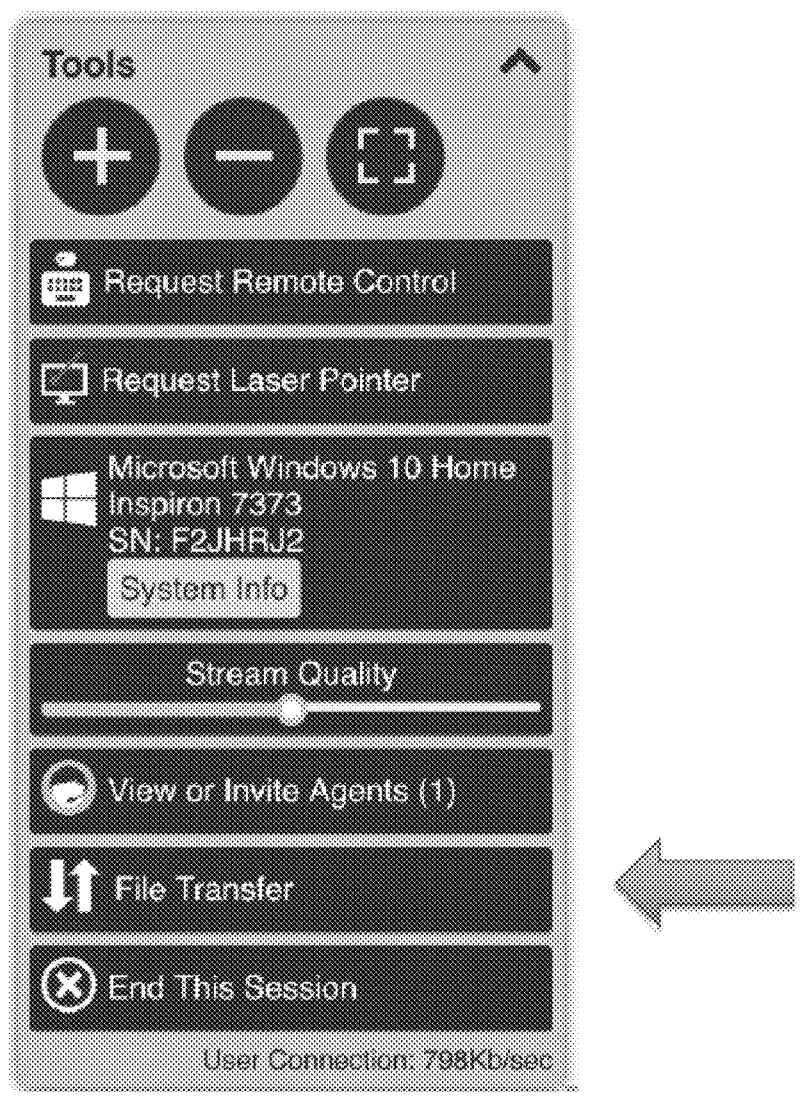
FIGS. 11a-11e illustrate examples of user interfaces that can be used to effect a file transfer.
Figure 11B:
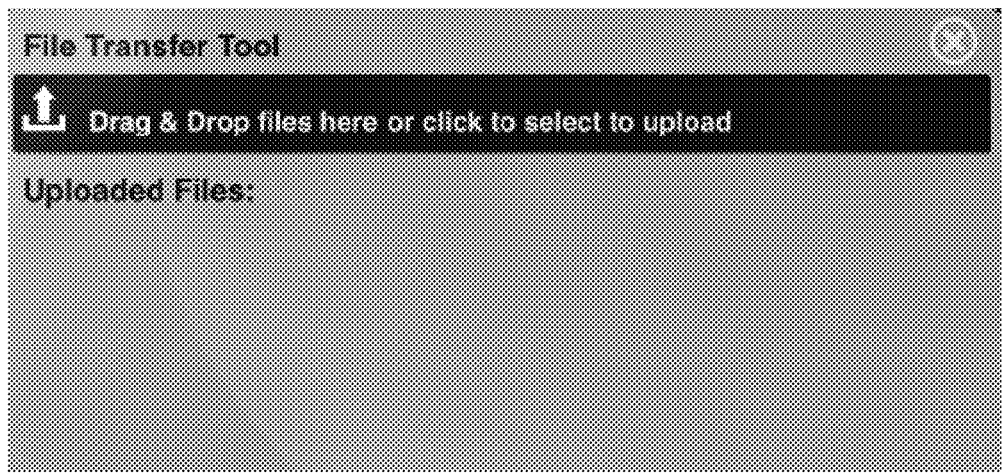

User interfaces at agent and customer devices for a file transfer process are illustrated in FIGS. 11*a*-11*e* according to an embodiment. FIG. 11*a* illustrates a graphical user interface through which an agent may choose any of several tools. If the agent wishes to transfer a file to a customer, he can select the file transfer tool as shown. At this point, the agent may be shown the graphic in FIG. 11*b*; here, the agent may be given the option of dragging and dropping an icon into this window, where the icon corresponds to the file to be transferred, or clicking on that icon.

Figure 11C:
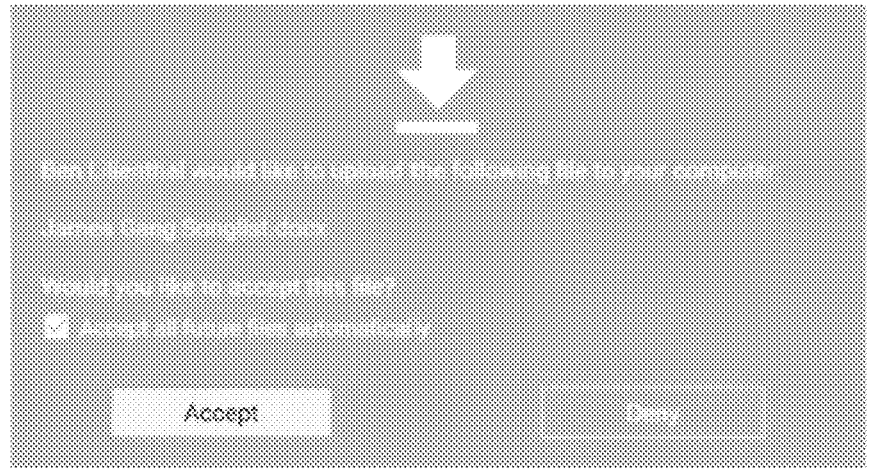
Figure 11D:
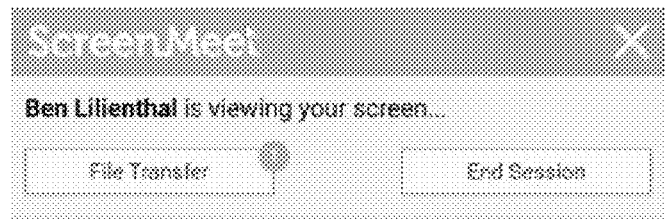
Figure 11E:
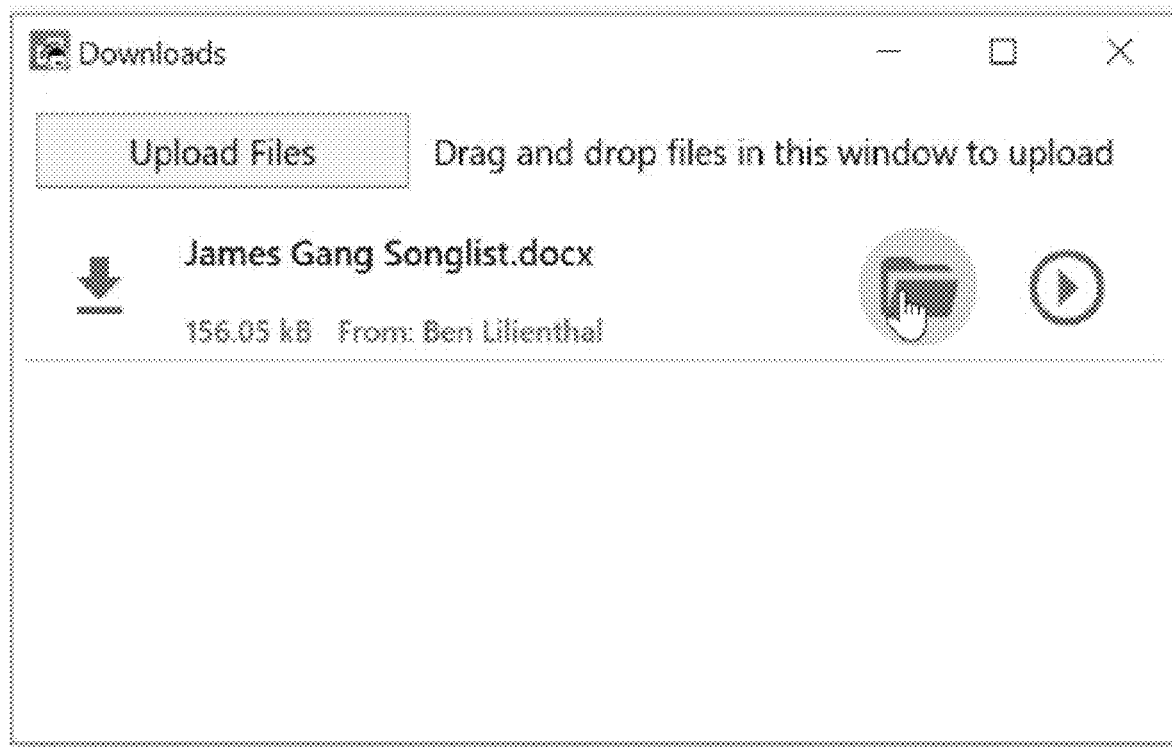

FIG. 11*c* illustrates the notification that may be sent to the customer device, according to an embodiment. Here the customer is asked if he would like to accept the file. In the illustrated embodiment, the customer also has the option of accepting all future files automatically. FIG. 11*d* shows a graphic that may be presented to the customer, where the customer may initiate the transfer. The customer may then download the file using the graphic of FIG. 11*e*, according to an embodiment. Alternatively, the customer could simply access the file using the play button.

While FIGS. 11*a*-11*e* illustrate a file transfer from an agent to a customer, a transfer may also be performed from a customer to an agent in an analogous manner using similar user interfaces, according to an embodiment.

Figure 12:
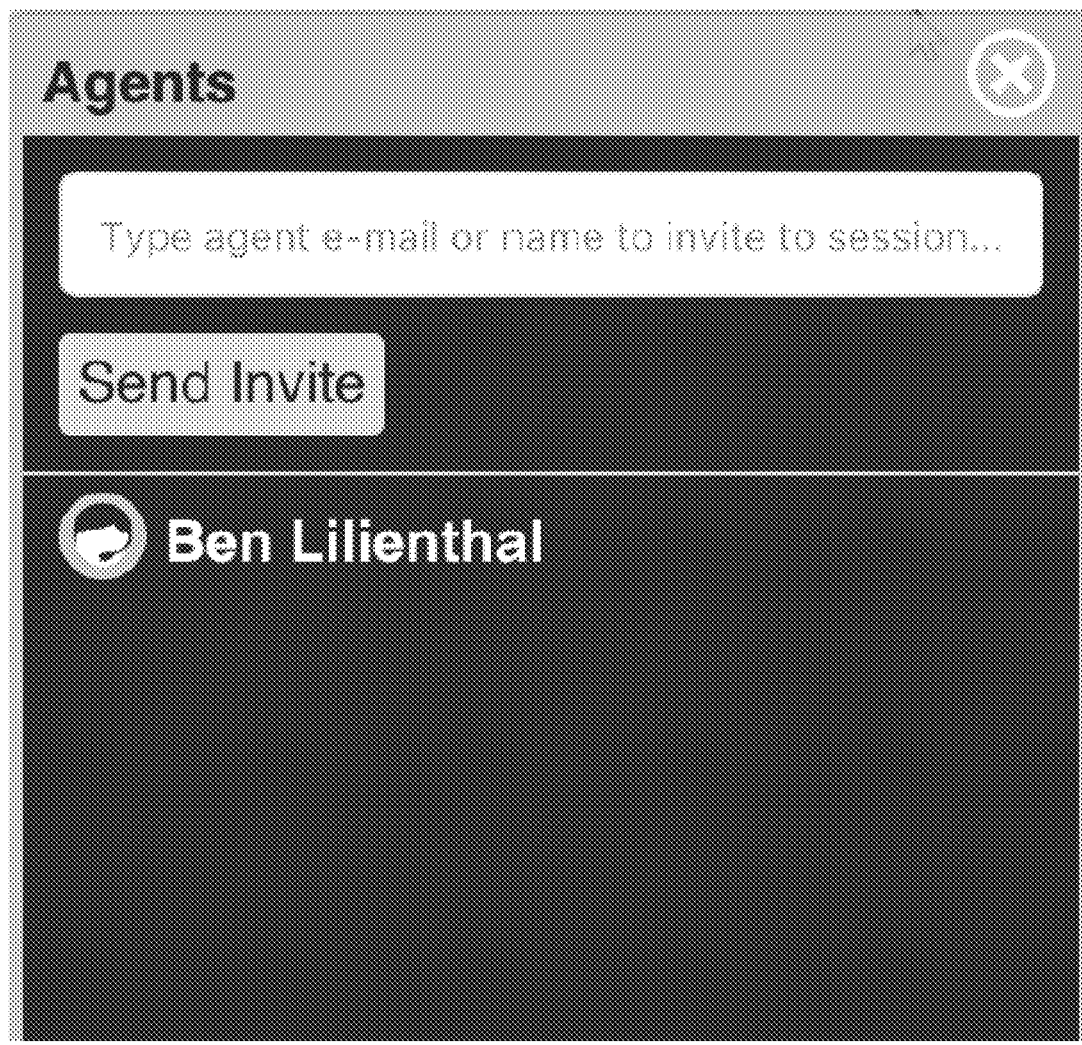
FIG. 12 illustrates an example interface that may be used to invite an additional agent into a session.

In the course of assisting a customer at 416 (or elsewhere in the process of FIG. 4), the agent may wish to invite an additional agent to a session. This may take place during a session with a customer, or as a preliminary action before the customer joins. In an embodiment, the original agent may initiate such an invitation by providing an input to a graphical user interface. Such an interface is shown in FIG. 12, according to an embodiment. Such an input may trigger the creation and sending of an email to the additional agent, where the email may contain a link. When the additional agent clicks on the link, he joins the session pending any required authentication. In an embodiment, the additional agent may have to be pre-authorized before joining the session. For example, a group of authorized personnel and/or their computing devices may be predefined, where this group represents parties authorized to take part in the session if invited. Once the additional agent has joined the session, he may have similar privileges as the original agent, e.g. the ability to see and/or control the customer's screen. In an embodiment, more than two agents may take part in the session, assuming that such additional agents have been invited according to the protocol discussed above. When any additional agent joins a session, this event may be logged for security, quality control, or other archival purposes.

At any point in the session, the user can elect to pause the session in an embodiment; during such a pause, the agent, normally able to see the customer's screen, is unable to do so. In embodiment, the agent may see a blank screen where he would otherwise see the customer's screen. The customer may subsequently resume the session, at which point the agent will once again be able to see the customer's screen on the agent's display.

Returning to FIG. 4, if the agent does not need additional access to the device (step 418), the process continues at step 426.

If the agent needs additional access to the device, such as "laser pointer" operation, remote control of the device, or other available functions, the process branches to step 420 where the agent activates a request for the desired function via the browser. Then, in step 422 the server conveys the access request to the device, and depending on the interaction application and operating system requirements, the customer may be asked to explicitly authorize access to the function. When the user has authorized access, the agent can use the function and the process proceeds to step 426.

In step 426, if the session is complete, the process ends. Otherwise, the remote screen display on the browser is updated by the server in step 424 and the process begins again with step 416. The process continues to operate in the loop shown in the lower portion of FIG. 4, until either the agent or the customer terminates the session.

While the display function is active, the agent can preferably use either the mouse, touch gestures, or button controls in the menu to manipulate the display canvas, and can zoom and pan the image on the display canvas.

If the customer authorizes the agent to use a "laser pointer" function, or control mouse and touch gestures on the customer computing device, mouse and touch gestures that happen on the display canvas are transmitted back to the server and then relayed back to the interaction application. The interaction application will then translate those events into native device input and display commands in the customer computing device. For example, if the "laser pointer" function is activated, the agent can use his local pointing device to select a point on the displayed copy of the customer's device screen, display a bright red (or other colored) dot at that location, and move the dot with the local pointing device to draw the customer's attention to a desired area or function.

If the customer authorizes the agent to have mouse or touch control, the agent can move his local pointing device to any region of the displayed customer screen copy and then actuate a mouse or touch function that will be transmitted to the server and replicated on the customer computing device.

Figure 5:
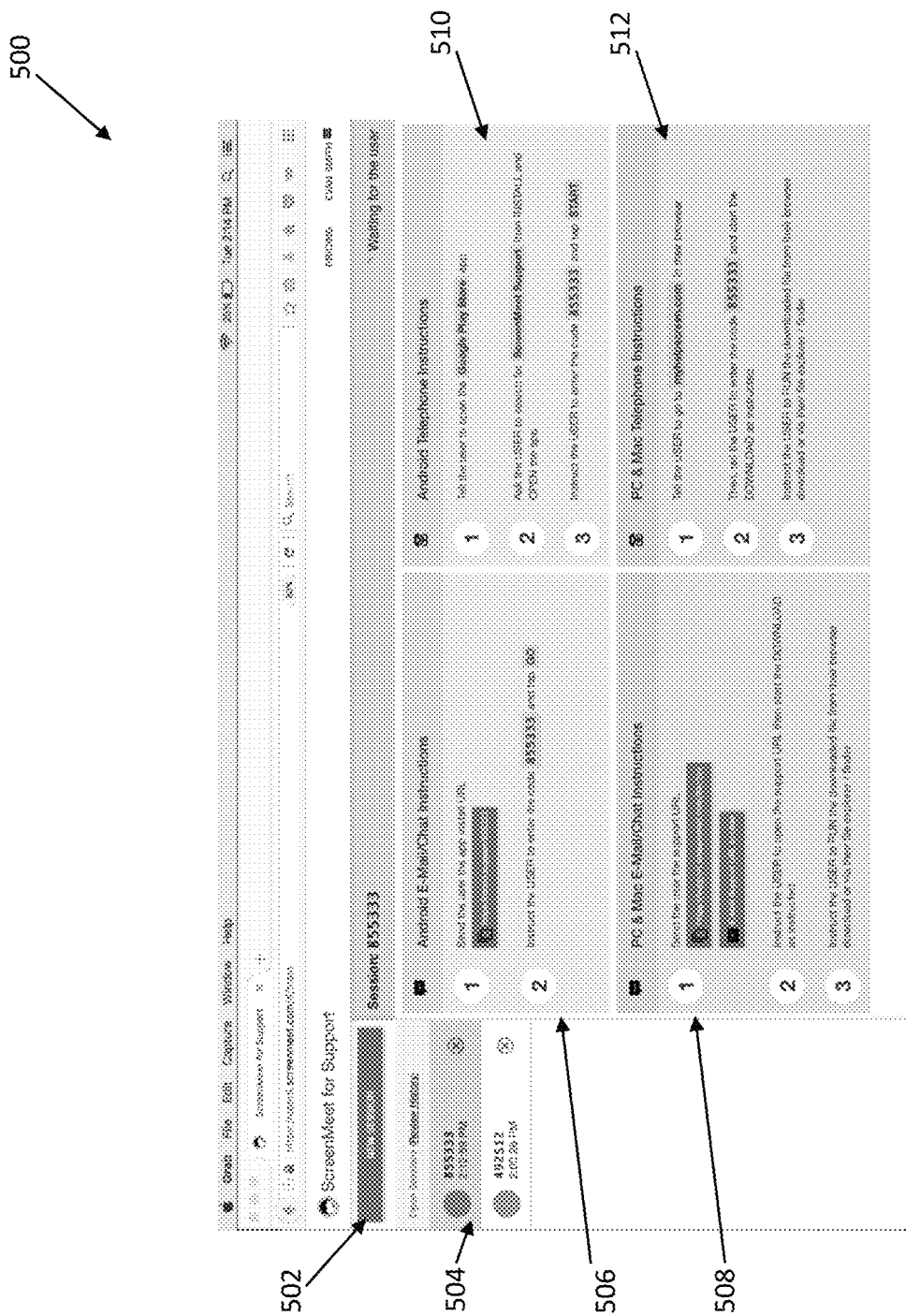
FIG. 5 is an example screen image of a connection initiation screen in a browser-based remote support embodiment.

FIG. 5 shows an image of an example connection initiation screen 500 generated by the server and transmitted for display in the agent's browser. In this example embodiment, on the left side of the screen there is a touch/click button 502 that initiates a new remote viewing session. In the example screen of FIG. 5, two active sessions are listed in session list 504, each identified by a six-digit number generated by the server software 106 and displayed for the agent: 855333 and 492512.

The right side of the screen in the embodiment of FIG. 5 provides four quadrants, each containing instructions for a method of connecting to a specified remote device operating system. The elements of these instructions and the configuration of the system may be adjusted based on the customers and customer devices to be supported and the available methods of customer contact. In the example embodiment shown, Android email/chat instructions 506, PC & Mac email/chat instructions 508, Android telephone support instructions 510, and PC & Mac telephone instructions 512 are displayed.

An example process for Android email/chat in this example embodiment is described on-screen in instruction area 506. First, the agent will send the customer (user) the install URL for the interaction application. This is preferably accomplished by clicking on the "send" button. Depending on the type of support connection between the agent and customer, the agent may enter the user's email address or telephone number to send the URL as an email or an SMS message. Alternatively, if the agent is connected to the customer via a text support application, preferably the install URL is transmitted as a message in the text support application. In another embodiment, clicking on the button copies the install URL into the agent computing device copy-and-paste buffer so that the URL can be transferred to the customer. In an example embodiment, after the customer installs the interaction application, the agent asks the user to enter the unique session ID (in the example, 855333) and tap to proceed.

An example process for Android telephone support in the example embodiment is described on-screen in instruction area 510. In this example, the agent preferably provides the customer with a link to access the interaction application at the Google Play Store, (in this example, "ScreenMeet™ Support") and install and open the interaction application. Alternatively, the agent may instruct the customer to manually access and locate the application in the Google Play Store. The agent may then prompt the user to enter the unique session ID (in the example, 855333) which will securely connect the user to the agent.

An example process for PC & Mac email/chat support is shown in instruction area 508. Two buttons are provided, one to text a support URL to the user's device or copy the URL to a copy-and-paste buffer in the same manner described previously, and the other to open a pre-populated email to send the URL to the user. The support URL points to a web page that queries the PC or Mac to identify the active operating system, and then allows the user to download a compatible version of the interaction application. In an embodiment, the agent then instructs the user to open the support URL, download the application, and enter the session ID.

An example process for PC & Mac telephone instructions is shown in instruction area 512. The customer is instructed to enter a URL (for example, "myhelpscreen.com" in their browser and enter the session code to initiate a download of the interaction application. The customer then runs the downloaded application to start the session.

In some embodiments, the session ID is imbedded in the session URL to streamline downloading and activation of the interaction application; the resulting download file may be pre-configured to work only with the session ID transmitted in the download request.

In an embodiment, the session ID code is a one-time code specific to the current session, so that the downloaded copy of the interaction application will be functional only for the currently active session ID and not for any other future session.

The right side of the screen can be divided into a larger or smaller number of areas, each providing instructions for a different supported customer device operating system. Alternatively, if the number of supported operating systems and device types becomes too large for all to be displayed, the target operating system may be selected from a menu, with the instructions for connecting to that device displayed on a subsequently generated browser screen.

Figure 6:
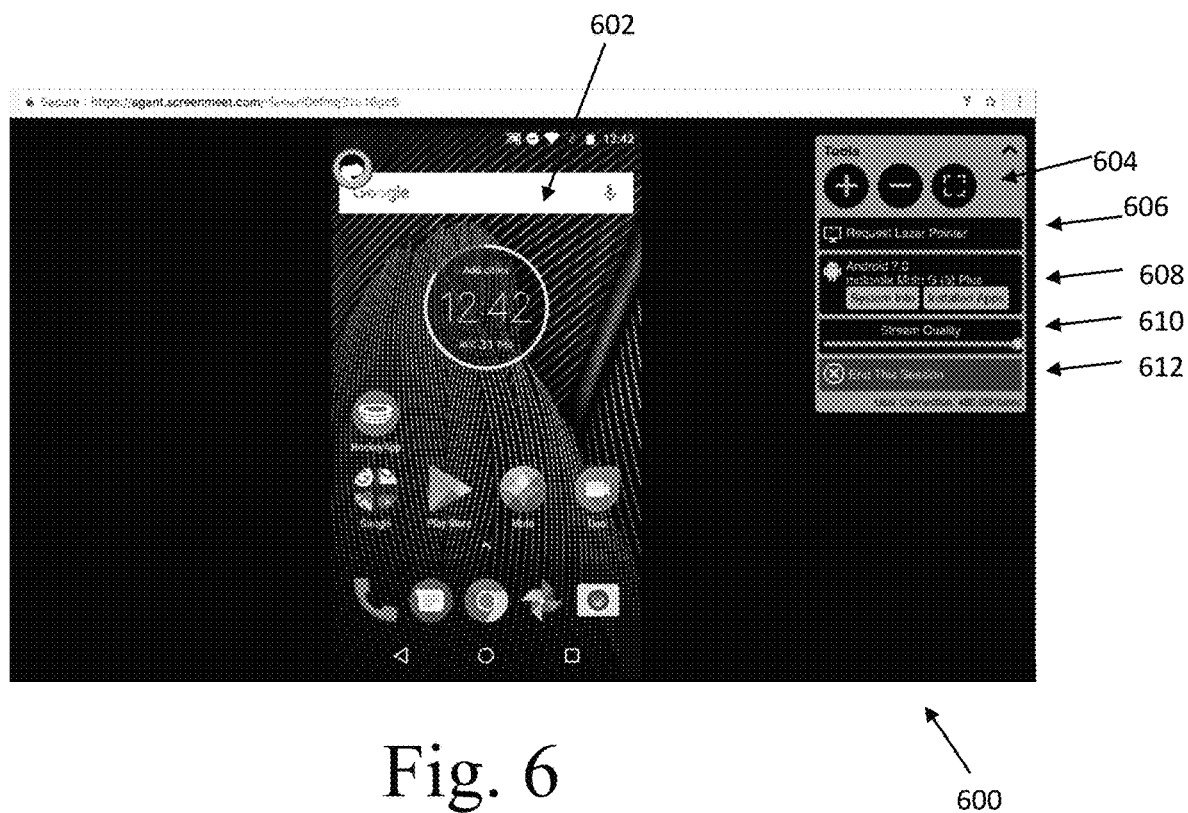
FIG. 6 is a screen image of an example embodiment of a browser-based remote support application configured for Android support.

FIG. 6 is a screen image of an example embodiment of a browser-based remote support application screen 600 configured for Android device support. In the example embodiment, this screen is generated by the server to display the current screen view 602 of the customer's device. A tool panel 604 allows the agent to select desired functions. Zoom and pan controls may be provided. Selection button 606 transmits a request to the interaction application to authorize use of the "laser pointer" function. If the customer accepts this request when displayed for the customer by the interaction application, the agent can "point" to areas of interest by moving a pointer cursor provided for that purpose, using the agent computing device's pointing device (such as a mouse or touchpad). The browser script transmits the desired location of the pointer to the server, which communicates this information to the interaction application in the customer device. The customer device then displays a distinctively colored circle (or other shape if desired) at the indicated location. In an embodiment, the agent can change the size and color of the pointer spot displayed on the customer's screen in addition to its position.

In the example embodiment, the server obtains device information from the interaction application and displays the type of device used by the customer. In the example, the customer has a Motorola Moto G(5) Plus running an Android 7.0 operating system and this information is displayed in the tool panel 604. Selection buttons 608 allow the agent to selectively display system information (see FIG. 7) and a list of installed applications on the device.

Region 610 of the tool panel 604 provides an on-screen slider function allowing the agent to increase or decrease the quality of the screen display stream. The quality of the stream can be reduced to compensate for slow transmission speeds. Button 612 terminates the session.

Figure 7:
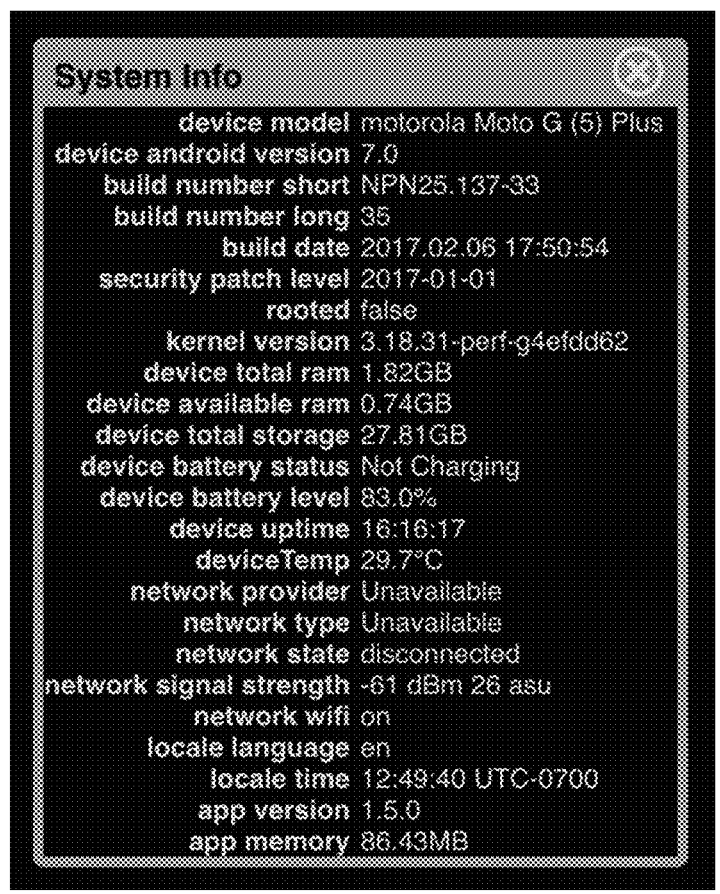
FIG. 7 is an example screen image of an Android system information display associated with the configuration of FIG. 6.

FIG. 7 is an example screen image of an Android system information display associated with the configuration of FIG. 6. When this function is selected by the agent, the information shown in FIG. 7 is retrieved from the customer's device and transmitted via the server as a popup on the agent computing device.

Figure 8:
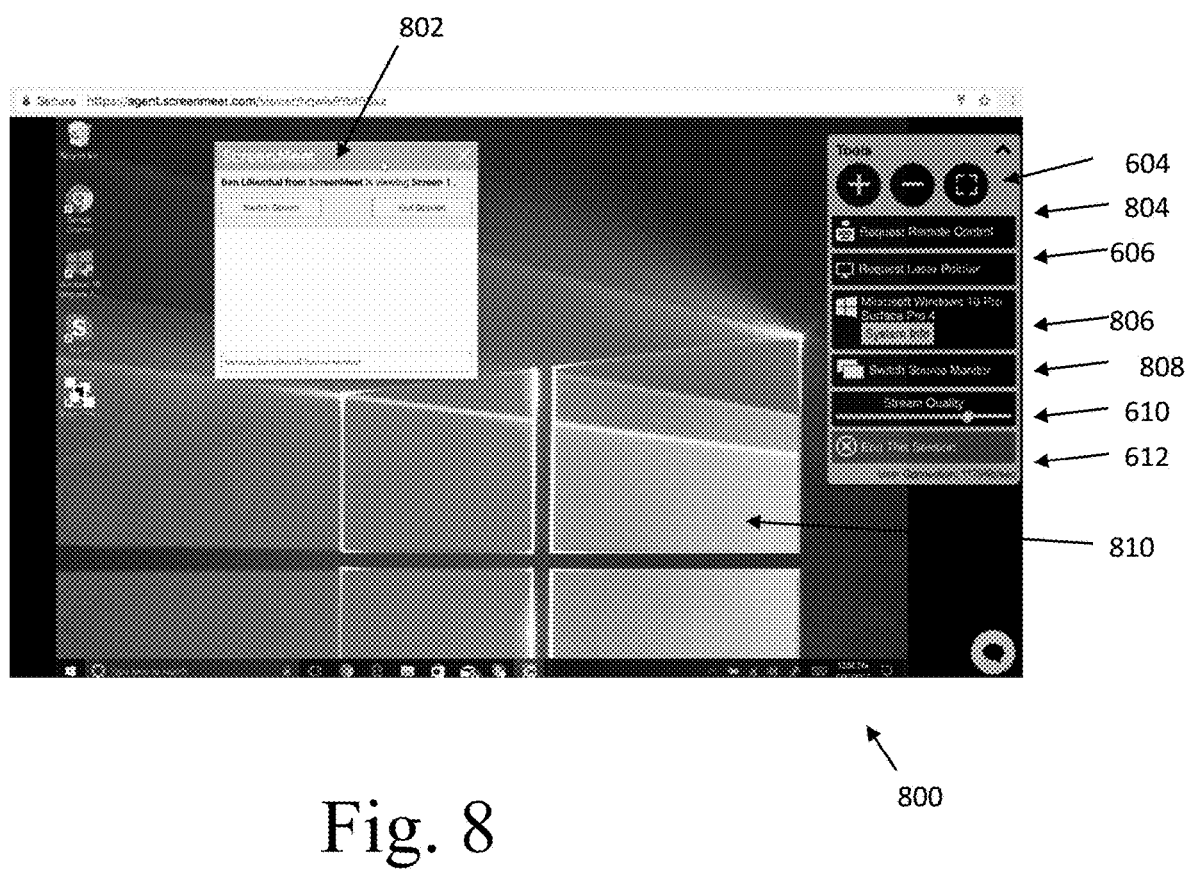
FIG. 8 is an example screen image of a browser-based remote support application configured for Windows support.

FIG. 8 is an example screen image of a browser-based remote support application screen 800 configured for Microsoft® Windows device support. Popup 802 allows the agent to exchange text messages with the customer and to switch between screens if the customer's operating system is configured for multiple displays.

FIG. 8 incorporates a tool panel 604 which is comparable to tool panel 604 in the embodiment of FIG. 6, but includes additional available functions as illustrated in FIG. 8. Pan and zoom controls, laser pointer request function 606, stream quality 610, and session end button 612 operate in a manner similar to the tool panel in FIG. 6. The embodiment of FIG. 8 also has a "request remote control" button 804 that, when selected and authorized by the customer on his device, gives the agent control over the customer's mouse functions as well as providing the additional function selections shown in FIG. 9.

Region 806 displays the type of device and includes a "system info" button that the agent can activate to display available Windows system information. Button 808, when selected, allows the agent to switch source monitors.

Figure 9:
FIG. 9 is a more detailed image of an example remote control overlay used in the configuration of FIG. 8.

FIG. 9 is a view of an example tool panel image displayed when the remote control function is active in the embodiment of FIG. 8. As shown in FIG. 9, when the agent has been authorized to "remote control" the customer's device, the agent can access Request UAC permission, Reboot and Reconnect, and Reboot in Safe Mode functions. A button to terminate the remote-control function is also provided.

Figure 10:
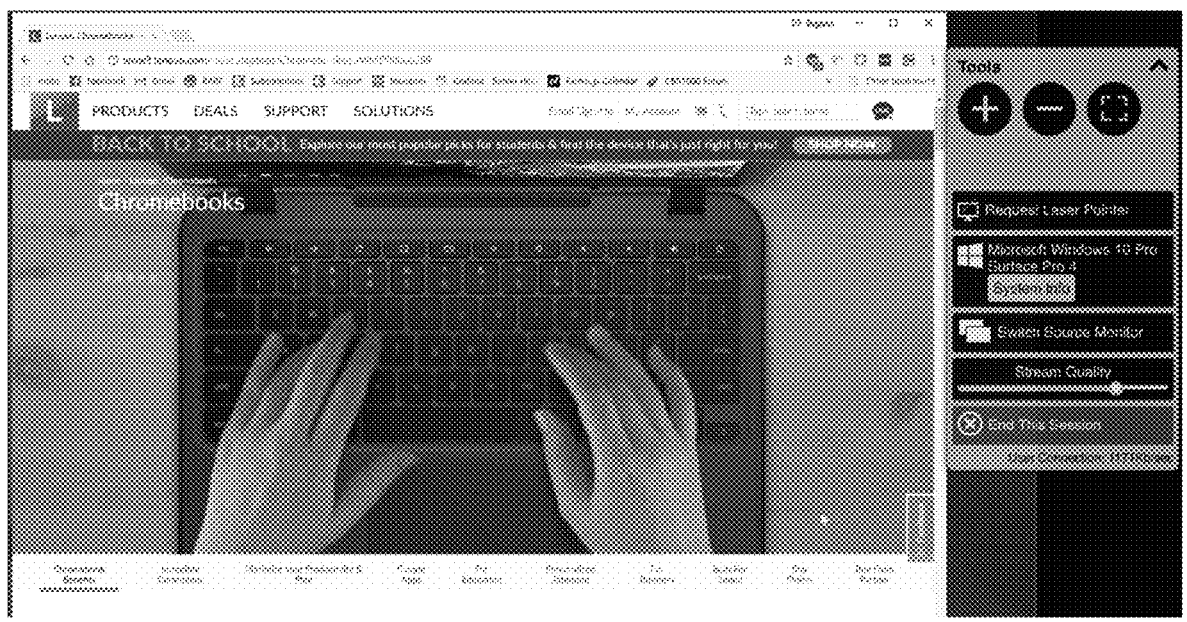
FIG. 10 is an example screen image of a browser-based remote support application configured for Chromebook support.

FIG. 10 is a view of a screen display in an example embodiment configured to support Chromebook devices.

Those skilled in the art will recognize that the embodiments, functions, and interaction concepts disclosed herein can be applied to a variety of devices and operating systems. Further, these concepts can be applied to enable interaction with future operating systems and new versions of current systems, as they are developed and gain popularity.

In an embodiment, a software development kit (SDK) is provided to enable developers to incorporate one or more functions of the disclosed system into a standalone application or cloud-based application. The functions of the server disclosed herein may be accessed via function calls and the calling application can selectively receive server output in data form that can be processed and formatted for display as desired in the standalone or cloud-based application. The SDK preferably also enables the disclosed system to activate features of the standalone or cloud-based application and exchange information with such applications. For example, the disclosed system may be integrated with systems that receive and track technical support requests. The disclosed system may also be integrated with applications that provide a web-based chat interface to customers, so that the links and messages transmitted in text form as disclosed herein can be sent via an already-active chat interface with the customer.

Although illustrative embodiments have been described herein in detail, it should be noted and understood that the descriptions and drawings have been provided for purposes of illustration only and that other variations both in form and detail can be added thereto without departing from the spirit and scope of the invention. The terms and expressions in this disclosure have been used as terms of description and not terms of limitation. Thus, the breadth and scope of the present invention should not be limited by any of the above-described exemplary embodiments, but should be defined only in accordance with the claims and their equivalents. The terms and expressions herein should not be interpreted to exclude any equivalents of features shown and described, or portions thereof.

We claim:

1. A computer-enabled process for remotely displaying one or more screen images of a user device at a viewer device, comprising:
   at the user device, executing an interaction application that transmits one or more screen image frames of the user device to the viewer device, which executes a script operating in association with a browser in the viewer device, wherein the script and browser operate to maintain a communications channel with the user device;

at the user device, electronically sending the frames from the interaction application to the viewer device, allowing the browser and script in the viewer device to electronically display the frames at the viewer device without a separate viewing application, and at the user device, engaging in a file transfer that enables access by the viewer device of a user device file or access by the user device of a viewer device file;

wherein the viewer device rejects the user device file on the basis of a configurable file filter.

2. A computer-enabled process for remotely displaying one or more screen images of a user device at a viewer device, comprising:

at the user device, executing an interaction application that transmits one or more screen image frames of the user device to the viewer device, which executes a script operating in association with a browser in the viewer device, wherein the script and browser operate to maintain a communications channel with the user device;

at the user device, electronically sending the frames from the interaction application to the viewer device, allowing the browser and script in the viewer device to electronically display the frames at the viewer device without a separate viewing application, and at the user device, engaging in a file transfer that enables access by the viewer device of a user device file or access by the user device of a viewer device file;

wherein the viewer device receives an input causing the viewer device to accept or reject all future file transfers from the user device, pending rescission of the input.

3. A computer-enabled process for remotely displaying one or more screen images of a user device at a viewer device, comprising:

at the user device, executing an interaction application that transmits one or more screen image frames of the user device to the viewer device, which executes a script operating in association with a browser in the viewer device, wherein the script and browser operate to maintain a communications channel with the user device;

at the user device, electronically sending the frames from the interaction application to the viewer device, allowing the browser and script in the viewer device to electronically display the frames at the viewer device without a separate viewing application; and at the user device, engaging in a file transfer that enables access by the user device of a viewer device file, wherein the file transfer comprises transfer of the viewer device file to a server from which the user device can open the viewer device file.

4. The computer-enabled process of claim 3, wherein the file transfer comprises transfer of the viewer device file to a server from which the user device can download the viewer device file.

5. The computer-enabled process of claim 4, wherein the user device rejects the viewer device file on the basis of a configurable file filter.

6. The computer-enabled process of claim 3, wherein the user device receives an input causing the user device to accept or reject all future file transfers from the viewer device, pending rescission of the input.

7. A computer-enabled process for remotely displaying one or more screen images of a user device at a viewer device during a session between a user and a viewer, comprising:

at the viewer device, executing a script operating in association with a browser in the viewer device, wherein the script and browser operate to maintain a communications channel with the user device, which executes a software interaction that transmits one or more screen image frames of the user device to the viewer device;

at the viewer device, using the browser and script to electronically display the frames without a separate viewing application;

at the viewer device, inviting an additional viewer device to join the session, wherein the screen image frames of the user device are also sent to the additional viewer device once the additional viewer device joins the session, wherein the viewer device and the additional viewer device are each able to control a screen of the user device and wherein the inviting is an event that is logged.

8. The computer-enabled process of claim 7, wherein the inviting comprises sending an email to the additional viewer device.

9. The computer-enabled process of claim 8, wherein the email comprises a link that, when selected at the additional viewer device, allows the additional viewer device to join the session.

10. The computer-enabled process of claim 7, where the viewer device or the additional viewer device invite a second additional viewer device to join the session.

11. The computer-enabled process of claim 7, wherein the additional viewer device joins the session only if the viewer device and the additional viewer device are both members of a predefined group.

12. The computer-enabled process of claim 7, wherein at any given time only one of the viewer device and the additional viewer device are able to control the screen of the user device.

13. A computer-enabled process for remotely displaying one or more screen images of a user device at a viewer device during a session between a user and a viewer, comprising:

at the user device, executing an interaction application that transmits one or more screen image frames of the user device to the viewer device, which executes a script operating in association with a browser in the viewer device, wherein the script and browser operate to maintain a communications channel with the user device;

at the user device, electronically sending the frames from the interaction application to the viewer device, allowing the browser and script in the viewer device to electronically display the frames at the viewer device without a separate viewing application;

at the user device, receiving an input from the user, wherein the input causes the session to pause, wherein during the pause in the session, the viewer device displays a blank portion in place of the screen images of the user device; and at the user device, receiving a further input, wherein the further input causes resumption of the session.

14. A computer-enabled process for remotely displaying one or more screen images of a user device at a viewer device, comprising:

at the user device, executing an interaction application that transmits one or more screen image frames of the user device to the viewer device, which executes a script operating in association with a browser in the viewer device, wherein the script and browser operate to maintain a communications channel with the user device;

at the user device, electronically sending the frames from the interaction application to the viewer device, allowing the browser and script in the viewer device to electronically display the frames at the viewer device without a separate viewing application;

wherein the interaction application generates a visible pointer on the user device display, and the user device receives signals from the viewer device defining a location of the pointer and transmits corresponding instructions to the interaction application to control the pointer location.

15. The process of claim 14 wherein the user device receives signals from the viewer device defining a selection function to be executed at a location on the user display and transmits corresponding instructions to the interaction application to execute the selection function.

16. The process of claim 15, wherein the defining of the selection function by the viewer device is performed in response to a request from the viewer device and an authorization from the user device.

17. The process of claim 14, wherein the generation of the visible pointer on the user device display is performed in response to a request from the viewer device and an authorization from the user device.

* * * * *